United States Patent
Jahnke et al.

(10) Patent No.: US 8,918,516 B2
(45) Date of Patent: Dec. 23, 2014

(54) SYMBIOTIC CLIENT AND SERVER FOR EMBEDDED NETWORK SYSTEM

(75) Inventors: Richard Jahnke, Los Angeles, CA (US); Mariko Jahnke, Allen, TX (US); Steve Jahnke, Allen, TX (US)

(73) Assignee: Galixsys Networks LLC, Allen, TX (US)

( * ) Notice: Subject to any disclaimer, the term of this patent is extended or adjusted under 35 U.S.C. 154(b) by 822 days.

(21) Appl. No.: 12/434,141

(22) Filed: May 1, 2009

(65) Prior Publication Data

US 2010/0281176 A1    Nov. 4, 2010

(51) Int. Cl.
  *G06F 15/16* (2006.01)
  *H04L 29/08* (2006.01)
  *H04L 29/06* (2006.01)

(52) U.S. Cl.
  CPC ............... *H04L 67/02* (2013.01); *H04L 69/08* (2013.01); *H04L 69/32* (2013.01)
  USPC ........................................................ 709/227

(58) Field of Classification Search
  USPC ........................................................ 709/227
  See application file for complete search history.

(56) References Cited

U.S. PATENT DOCUMENTS

| | | | |
|---|---|---|---|
| 7,769,825 B2 * | 8/2010 | Karakashian et al. | 709/219 |
| 2002/0065849 A1 * | 5/2002 | Ferguson et al. | 707/513 |
| 2002/0107992 A1 * | 8/2002 | Osbourne et al. | 709/310 |
| 2003/0158998 A1 * | 8/2003 | Smith | 711/112 |
| 2004/0015578 A1 * | 1/2004 | Karakashian et al. | 709/223 |
| 2004/0064503 A1 * | 4/2004 | Karakashian et al. | 709/203 |
| 2004/0068584 A1 * | 4/2004 | Costa-Requena et al. | 709/246 |
| 2005/0060431 A1 * | 3/2005 | Lewontin | 709/246 |
| 2005/0117179 A1 * | 6/2005 | Ito et al. | 358/1.15 |
| 2009/0093237 A1 * | 4/2009 | Levenshteyn et al. | 455/412.1 |

OTHER PUBLICATIONS

"SOAP"—Wikipedia, the free encyclopedia, http://en.wikipedia.org/wiki/SOAP. Enclosed reference accessed Jul. 16, 2009.
"Representational State Transfer"—Wikipedia, the free encyclopedia, http://en.wikipedia.org/wiki/Representational_State_Transfer. Enclosed reference accessed Jul. 16, 2009.

(Continued)

*Primary Examiner* — Alicia Baturay
(74) *Attorney, Agent, or Firm* — Michael Stanley Tomsa; Katten Muchin Rosenman LLP

(57) ABSTRACT

A protocol with matching protocol creation and parsing engines on both the client and server facilitates the automatic transfer of data and commands in an autonomous fashion. This protocol and its corresponding engines make up a new services layer software stack that is above the existing application layer in the network stack. The protocol is based on standard HTTP over TCP/IP as the applications, transport and internet layers, but adds a means to frame commands and data to allow for any operation to be performed over a single service layer. Protocol creation and parsing engines reside on all clients and the server. The server-side protocol engine runs as a common gateway interface binary within a standard web server. The client-side protocol engine has the communication layer of a standard web browser, but replaces the user interface layers with an API to automate the passing of commands and data to the server protocol engine. The server is then able to execute upon client requests or pass requests back to a specific client.

20 Claims, 11 Drawing Sheets

(56) References Cited

OTHER PUBLICATIONS

"SOAP Tutorial"—W3Schools.com by Refsnes Data, http://www.w3schools.com/soap/default.asp. Enclosed reference accessed Jul. 16, 2009.

"Latest SOAP versions—SOAP Version 1.2" and "Simple Object Access Protocol (SOAP) 1.1", 2004 W3C® (MIT, ERCIM, Keio), http://www.w3.org/TR/soap/. Enclosed reference accessed Jul. 16, 2009.

* cited by examiner

SYMBIOTIC CLIENT AND SERVER FOR EMBEDDED NETWORK SYSTEM

TECHNICAL FIELD OF THE INVENTION

The technical field of this invention is computer systems and more particularly networked computer systems.

BACKGROUND

The ability to have an always-on wireless internet connection has been one of the great promises of wireless LAN (WiFi) and advanced cellular (3 G) technologies. Although fundamentally competing technologies, the ubiquity of the coverage promised by both, along with the broadband-like data rates possible, has resulted in broadband wireline-like functionality for wireless devices, but with the additional possibility of having the devices be untethered from any single location. This promise has been largely fulfilled for both laptop computers, where WiFi has been embedded into nearly all devices, and in cellular phones, where the 3 G capability of modems has led to a whole category of "smart phones", enabling enterprise software client capability (email, web browsing) and even media services (streaming video, for example). Although both the laptop PC and cellular phone industries are large, growth has moderated due to saturation in the market. As a result, both the WiFi network and cellular operators are looking for new types of products to not only make use of the infrastructures already built, but also for a compelling use case for next generation wireless technologies (WiMAX and LTE, respectively).

A new product category conceived is the mobile internet device (MID). Although a MID can take many form-factors, the defining characteristic is to offer a PC-like internet experience on a wireless device. The trend with the MID is to increase the computational and user input/output (I/O) functionality to offer PC capability in a portable wireless device. A MID offers many features to the consumer in a single device, including a web browser, email client, media player and even productivity software or other third-party applications. Technically, with the requirement of offering multiple features in a single device, this demands a high-level operating system and user interface, with nearly all the complexities to the end user that a PC brings. The complexity of these devices is derived from the multiple features it is trying to offer; a device that has both web browser and camera functionality, for example, will not be as intuitive to use as a stand-alone digital still camera. The complexity inherent in the multi-functional role of a MID may prevent it from being a truly successful product category.

An alternate approach to creating new products for next generation wireless networks is to add wireless capability to existing product categories. This differs conceptually in trying to create a new product category that consolidates many existing products (q.v., a MID). The largest benefit of using an existing product category is that the market has already determined a need for the product, and it has been optimized in terms of functionality for its task. The addition of wireless capability to the product will now enable it to have an always-on internet connection. This will allow it to send and receive data geared towards whatever the product's functionality is. For example, by adding wireless capability to a camera, the user can now automatically upload pictures to an internet photo-sharing site, instead of having to first download the pictures to a PC. This internet-enabled feature, a great new use of the camera in a cell phone, can now be brought over to the dedicated platform for which its functionality has been most optimized for in terms of features and ease-of-use (i.e., the digital still camera). There are some barriers, however, that have prevented this adding of wireless capability to existing products that needs to be explored.

There have been three major barriers that prevented wireless capability from being added to an existing product line. First, the cost and system complication of adding wireless capability was very high. Prior to maturing, the wireless hardware would have been a significant cost addition, and it required a high level of technical expertise to integrate. Now, both WiFi and 3 G hardware modules have become commoditized, and cost and system integration is no longer a major barrier. Next, again due to the complexity of wireless systems and in the reduction of network bandwidth from voice services, the network carriers have been very reluctant to support non-phone devices on their network. However, with the significant increases in network capacity offered by WiMAX and 3 G/LTE and a mature phone and PC market, network operators have been much more willing to certify non-traditional devices. Finally, the addition of the wireless function must not add any additional complexity to the product. The reason is straightforward; the consumer has already been conditioned to a level of complexity for the given product category. Any obvious increase in user complexity due to the wireless feature will result in either the consumer not using the wireless functionality, or it would draw complaints to the manufacturer. The wireless functionality must be made invisible to the user. Further, many existing products operate independently and do not have direct interaction with a user (such as any monitoring device). It is this desire to make the wireless functionality autonomous and invisible to the end user that is the basis of the invention.

SUMMARY

A symbiotic protocol (SPCOL) is defined whose creation and parsing engines are running on both the host/server and client, this protocol facilitates the passing of both commands and data between the host/server and client. SPCOL makes up a new services layer that resides on top of the application layer in the network stack hierarchy. SPCOL serves as the single pipe and means to pass all information, be it raw data, files, or commands to perform services. SPCOL uses the Hyper Text Transfer Protocol (HTTP) as the foundation due to the ubiquity of web-based infrastructure. The server is a standard web server as a result (such as Apache), with the SPCOL engine running as a CGI-bin program. The client SPCOL engine is at its core a web browser, but significantly modified to communicate autonomously with the server. The SPCOL engines on both the client and server are the means to facilitate and to automate the communication between client and server.

SPCOL works by splitting up larger API functions into smaller commands. In order to split and convert the API functions, SPCOL contains a means for converting, which may be characterized as, but not limited to, a block of program code or software that is designed to perform the desired conversion. Each command activates the server to perform some partial action of the entire API. In order to store temporary API states, it is critical for the client to identify itself uniquely to the server so that the server SPCOL engine can manage temporary API states. Embedding the client-unique identifier directly into the SPCOL protocol facilitates the passing of this unique ID on each transmission. To facilitate storage, SPCOL also includes a means for storing commands and data, such as, for example, read-only memory (ROM) or random access memory (RAM)

By using a protocol and associated engine that has been co-developed to work together with a client and server, all specific functions required for the networked system can be provided via this single pipe. This will eliminate the need to run multiple applications on both the server and client to provide any given feature. By having a single protocol and engine to provide the pipe for all required services, the network communications software components can be significantly reduced, saving memory and complexity. To facilitate communication, SPCOL includes a means for receiving and a means for transmitting commands and data, which can be any conventional form of reception and/or transmission over a computer network, such as, for example, a modem, an Internet link, or a wireless network connection. Since SPCOL provides a means for sending commands and data, with the SPCOL engines as the single point in communication execution, control can be automated, eliminating the need for a user to initiate any actions. This will make the communication between client and server occur without user interaction, reducing the burden to the end user in having the wireless network functionality.

In one aspect, the invention provides a computer protocol for facilitating communication of commands and data. The computer protocol resides on a server computer, the server computer being in communication with at least one client computer via a network. The computer protocol comprises a receiving means for receiving a prompt from the at least one client computer. The prompt includes client identification information and a request for commands and/or data obtainable from applications or memory residing on the server computer. A storing means for storing the requested commands and/or data. The computer protocol further comprises a conversion means for converting the stored commands and/or data into a predetermined format and a transmission means for transmitting the converted commands and/or data to the at least one client computer via the network. The computer protocol is configured to enable all commands and data residing on the server computer to be converted into the predetermined format, and to use the client identification information to determine that the at least one client computer is a correct destination to which the converted commands and data are to be transmitted.

The predetermined format may comprise a command field, a client identification field, a packet size field, a data packet field, and a footer field. The computer protocol may be further configured to operate within the network in a service layer that resides on top of a Hyper Text Transfer Protocol (HTTP) layer. The computer protocol may be further configured to operate by using a network application residing in the HTTP layer. The at least one client computer may comprise a corresponding computer protocol configured to transmit the prompt to the server computer and to enable all transmitted commands and data to be received via the network and to convert each of the received commands and data from the predetermined format into a respective original format.

In another aspect, the invention provides a method for using a server computer to communicate commands and data over a network. The method comprises the steps of: receiving a prompt from a client computer via the network, the prompt including client identification information and a request for commands and/or data obtainable from applications or memory residing on the server computer; storing the requested commands and/or data; converting the stored commands and/or data into a predetermined format; and transmitting the converted commands and/or data to the client computer via the network, wherein the server computer is configured to enable all commands and data residing on the server computer to be converted into the predetermined format, and to use the client identification information to determine that the client computer is a correct destination to which the converted commands and data are to be transmitted.

The predetermined format may comprise a command field, a client identification field, a packet size field, a data packet field, and a footer field. The server computer may be further configured to execute the method within the network in a service layer that resides on top of a Hyper Text Transfer Protocol (HTTP) layer. The server computer may be further configured to execute the method by using a network application residing in the HTTP layer. The client computer may be configured to transmit the prompt to the server computer and to enable all transmitted commands and data to be received via the network and to convert each of the received commands and data from the predetermined format into a respective original format.

In yet another aspect, the invention provides a system for communicating commands and data over a network. The system comprises a server computer. The server computer being in communication with at least one client computer via the network. The server computer is configured to receive a prompt from the at least one client computer via the network. The prompt includes client identification information and a request for commands and/or data obtainable from applications or memory residing on the server computer. The server computer is further configured to store the requested commands and/or data and to convert the stored commands and/or data into a predetermined format. The server computer being further configured to transmit the converted commands and/or data to the at least one client computer via the network. The server computer is further configured to enable all commands and data residing on the server computer to be converted into the predetermined format, and to use the client identification information to determine that the at least one client computer is a correct destination to which the converted commands and data are to be transmitted.

The predetermined format may comprise a command field, a client identification field, a packet size field, a data packet field, and a footer field. The server computer may be further configured to receive the prompt, store the requested commands and/or data, convert the stored commands and/or data, and transmit the converted commands and/or data within the network in a service layer that resides on top of a Hyper Text Transfer Protocol (HTTP) layer. The server computer may be further configured to receive the prompt, store the requested commands and/or data, convert the stored commands and/or data, and transmit the converted commands and/or data within the network by using a network application residing in the HTTP layer. The at least one client computer may be configured to transmit the prompt to the server computer and to enable all transmitted commands and data to be received via the network and to convert each of the received commands and data from the predetermined format into a respective original format.

DESCRIPTION OF THE DRAWINGS

These and other aspects of this invention are illustrated in the drawings, in which.

DETAILED DESCRIPTION

Figure 1:
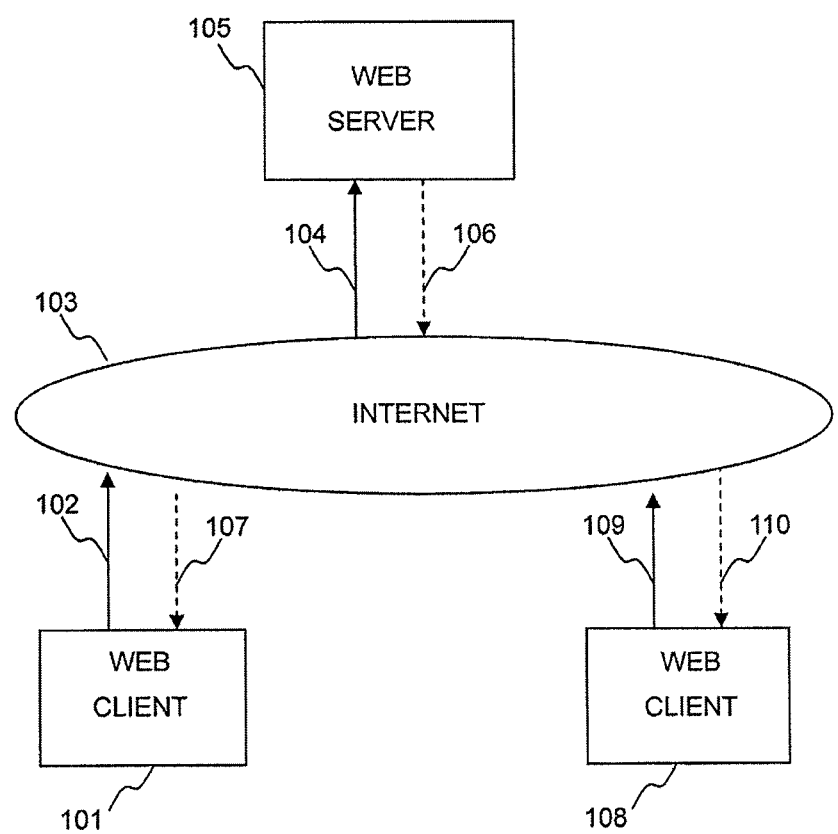
FIG. 1 illustrates the fundamental aspects of how the World Wide Web works, with clients initiating requests for services to a server according to the prior art.

The key factor to making wireless network functionality invisible to the end user is to automate as much as possible all network functions in such a manner that via normal use of the item, the wireless functionality performs its intended function without any additional inputs from the user. Further, since most of the network functionality that the wireless enabled device requires interaction with enterprise software on the backend, it is desired to use as much of the infrastructure around the World Wide Web as possible. This is best achieved by the creation of a client and server protocol and its corresponding engines that use the HTTP network application to facilitate all communication.

The HTTP network application has been designed to primarily serve up web pages from a web server. On the client side, the primary function of the web browser is to serve as the human input-output (I/O) portal to the internet. As a result, the web browser is designed to allow an efficient means to display content in an easy-to-digest manner. Much of the technology and innovation within a web browser is to make it as easy as possible for the user to digest content. Further, if the web page is to provide a service to the consumer, the web browser provides a means to provide input or send data via the forms concept to the server. The server is then able to, via a server side program, store or act upon the user request. The server side function of the HTTP network application is primarily a means to pass information to the web browser and whatever enterprise server-side software is desired.

The HTTP network application provides a very solid basis for interfacing a client with the enterprise backend software. However, the client-side browser is designed to interface efficiently with a user; it is not designed well to provide a means of automation. In order to provide a means to automate server requests, a protocol and API needs to be developed that is matched on both the client and server. This is most efficiently done by adding a new service layer on top of the existing HTTP network application. This protocol and API can be added to existing web browsers to add an automation capability, or can be created as a new client to provide a much more lightweight and embedded product. The server side code is the same in either case; it runs as a separate CGI-bin program on the web server. This service layer built on top of the HTTP application layer is the foundation of SPCOL.

An alternative to building a new service layer on top of an existing network application such as HTTP is to create a new network application product. This would involve the creation of a new client and server architecture that would facilitate the automation of network tasks. While this is the traditional means to add new network functionality, there are several drawbacks to this approach. First, the main function of the server code is not only to provide a means of passing information from the client to server, but also to provide an interface to all existing backend enterprise functions, such as database interaction. This interface is well defined and easily understood with existing HTTP servers, and it would need to be replicated with the new network application code. Next, the robustness of the HTTP application layer is very high as it is used by all web-based internet applications. Again, this robustness and compatibility with existing web applications would need to be replicated in a new network application layer product. Finally, although the client side software needs to be developed to provide the automation in either a new network application product or in a service that builds on top of the HTTP application layer, the plethora of new web based products and services could not be leveraged if a new network application layer is developed; by building on top of the existing HTTP application layer, any new web based service or application can be easily adapted to instead of having to modify base functionality in a new network application.

FIG. 1 shows the basic function of the HTTP network application. A client computer running the HTTP client 101 initiates communication with the internet 103 using the TCP/IP transport and internet protocol 102 and is routed to the web server 105 via the router TCP/IP protocols 104. Responses to the web client 101 are sent by the web server 105 to the internet 103 via the TCP/IP transport and internet protocols 106 and are routed from the internet 103 to the web client 101 via the router TCP/IP protocol 107. Multiple clients are supported as shown in web client 108 who communicate in the exact same manner with the internet 103 and web server 105 via a different TCP/IP address, but the same TCP/IP protocol 109 and receives server responses via the router TCP/IP protocol 110.

The foundation of the HTTP network application is that clients initiate all requests. The server listens to all requests from web clients and serves up pages accordingly. The server cannot initiate a request to a client.

Figure 2:
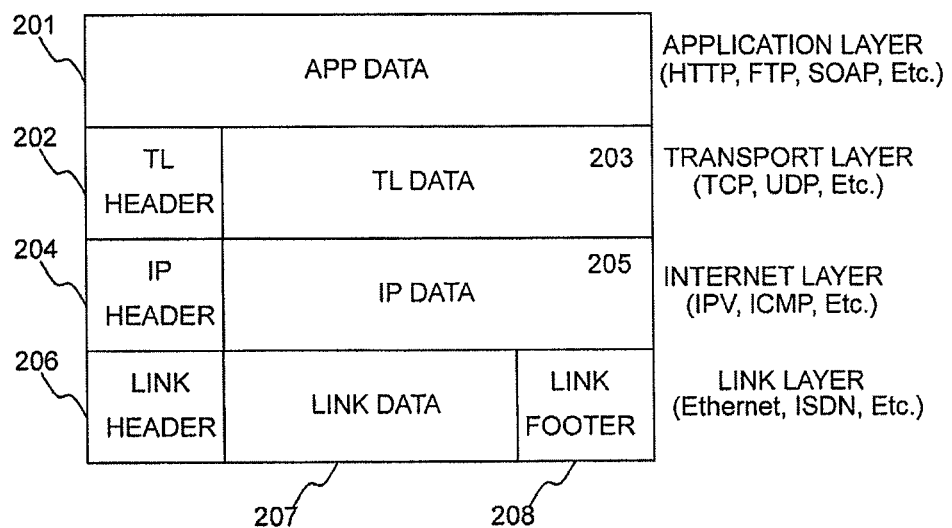
FIG. 2 illustrates the hierarchy of network software stacks according to the prior art.

FIG. 2 shows the existing network software hierarchy. The application layer resides at the top and whose application data 201 is in a format as defined by the specific network application. The application layer makes use of the Transport layer, whose data is framed with a transport link (TL) header 202 and its transport link payload 203. The transport layer is built upon the internet layer whose data is framed with an internet protocol (IP) header 204 and IP payload 205. Finally, the internet layer is built upon a physical link layer whose data is framed with a link header 206, a link payload 207 and a link footer 208.

Examples of existing network applications include the Hyper Transfer Text Protocol (HTTP) to make use of the World Wide Web, the File Transfer Protocol (FTP) to provide a means to transport files across the internet and the Simple Object Access Protocol (SOAP) to provide a means to pass documents across the internet. SOAP is unique as a network application in that it also is built upon HTTP and uses Remote Procedure Calls (RPC) as its foundation for communication and a standard web browser as its base to take in input from the user and to display the objects returned (namely, XML files). Although HTTP was not built for this purpose, and there is much debate whether SOAP has the correct architecture to most efficiently pass documents as a result, its existence proves the versatility and adaptability of HTTP to many uses beyond its intended purpose. Additionally, contrary to SPCOL, SOAP must be structured in advance to work with each application.

Figure 3:
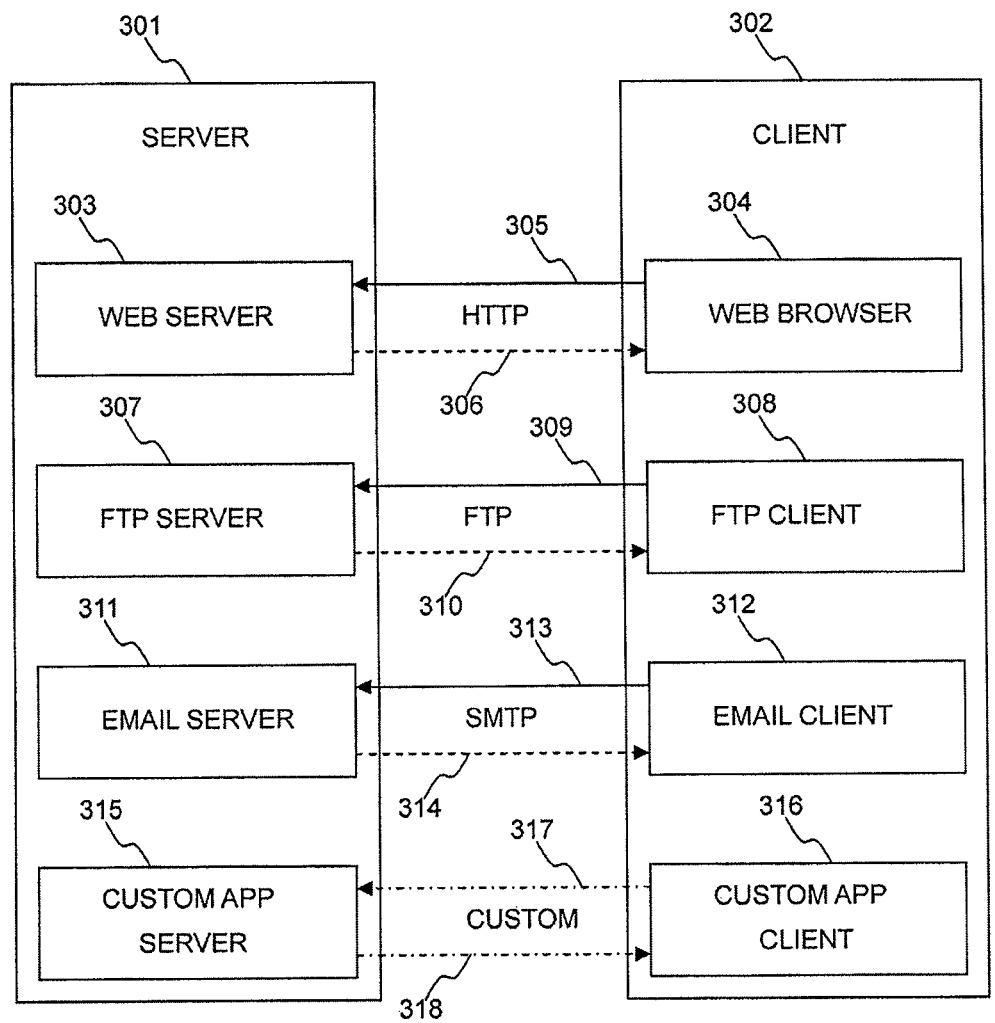
FIG. 3 illustrates how individual, separate applications are required to run on a host for each base client in order to provide a complete system according to the prior art.

FIG. 3 shows the foundation of the internet and an example of the various separate network applications that co-exist. A server 301 communicates with a client device 302 by using multiple network applications and protocols. A web page is served up by a web server 303 to the client's web browser 304 upon an HTTP request 305, with the server response over HTTP 306. If the client wishes to simply transfer a file to the server, the FTP client 308 initiates a request to the server's FTP server 307 by using the FTP protocol 309. Responses are sent back by the FTP server 307 to the FTP client 308 via the FTP protocol response 310. If the client wishes to simply send an email or poll the server to see if a message exists, the email client 312 is invoked, which communicates to the email server 311 via the SMTP protocol 313. The email server 311 responds to the message sent, or delivers a queued email to the email client 312 via the SMTP response 314. If a custom function is desired, a new network application needs to be developed, including its protocol and corresponding client and server engines. A custom app client 316 can either initiate a request to the custom app server 315 via the custom protocol 317 with responses coming via the custom response 318, or the custom app server 315 can broadcast messages to clients 316 via the custom broadcast protocol 318, with clients responding via the custom response 317. Due to the large number of devices on the internet, most network application protocols have the client initiate all requests to reduce bandwidth.

Under the existing network application concept, each service that is to be provided (be it web browsing, file transfer, email, etc.) requires a separate client and server protocol and engine. In order to provide a complete user experience, multiple clients must run on the host device as well as multiple server applications on the network server. The HTTP network application is somewhat unique in that at its foundation, raw data may be sent so long as the client has a means to capture the data and the web server has an appropriate CGI-bin program that can service the raw data. This capability is the foundation of SPCOL.

Figure 4:
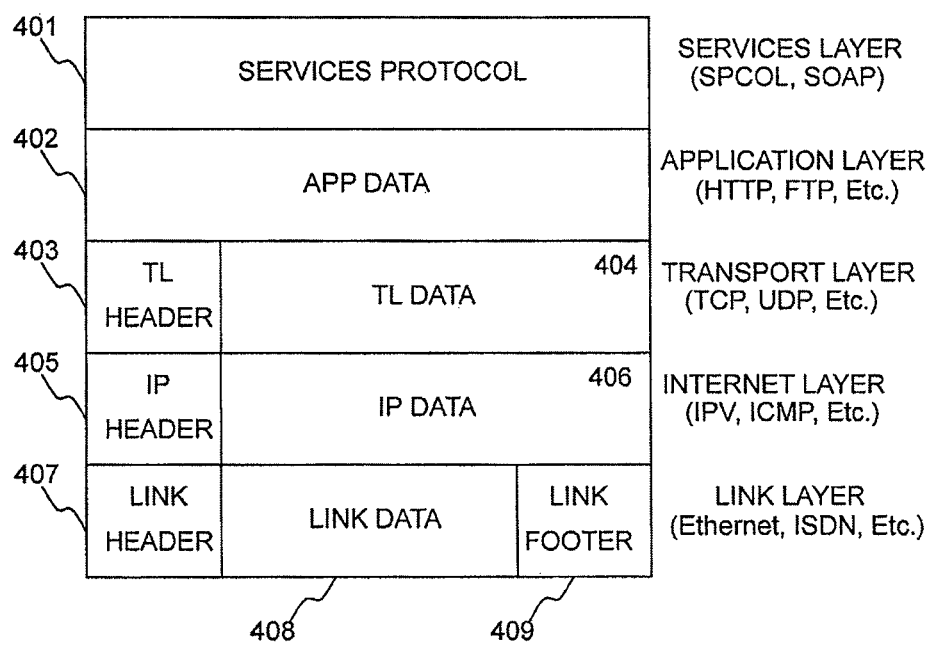
FIG. 4 illustrates the addition of a new software layer, the services layer, to the standard network software stack according to the prior art.

FIG. 4 shows the addition of a new services protocol on top of the existing application layer in the network software stack. The services layer is made up of a services protocol 401 and resides on top of the existing application layer. The services protocol frames various application data formats 402 to provide the total service desired. The application layer follows whose application data 402 is in a format as defined by the specific network application. The application layer makes use of the Transport layer, whose data is framed with a transport link (TL) header 403 and its transport link payload 404. The transport layer is built upon the internet layer whose data is framed with an internet protocol (IP) header 405 and IP payload 406. Finally, the internet layer is built upon a physical link layer whose data is framed with a link header 407, a link payload 408 and a link footer 409.

Under this network software architecture, the existing SOAP network application is moved to the services protocol layer as it not only uses HTTP as a data link, but also various other network application stacks. The web browser is also the main I/O engine to receive object requests and to display object results. Although SPCOL also resides in this services layer and uses HTTP as a raw data link, it differs from SOAP in that it does not require a web browser as the means of receiving input to send to the server. Rather, it is a protocol engine that interfaces with existing client services that allows the client device to automate via a collection of APIs the transfer of data between client and server without requiring a user to interact with a web browser. In SPCOL, the existing UI mechanism (if its client device has one) is used to retrieve input and display output. In a pure automated client, no UI is required.

Figure 5:
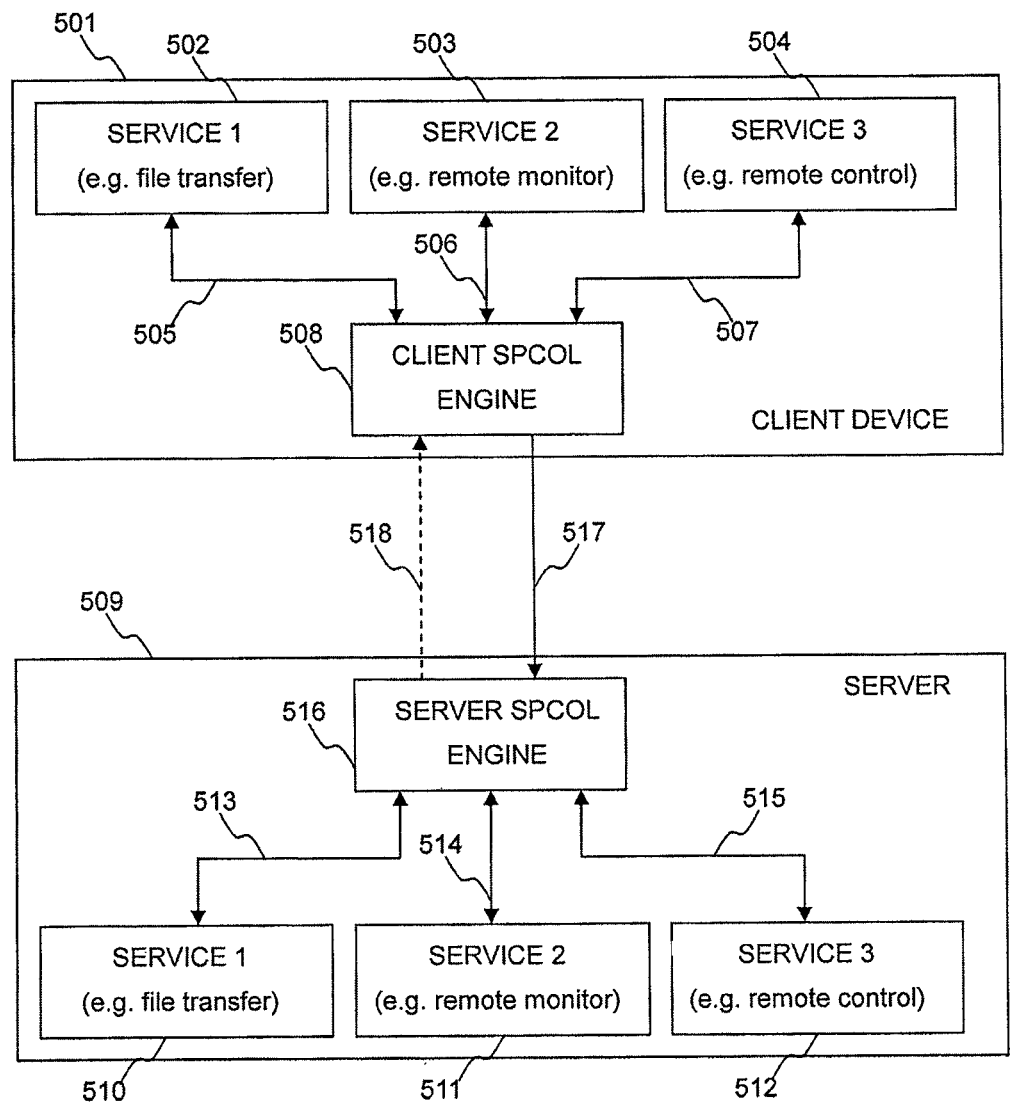
FIG. 5 illustrates the use of SPCOL and its symbiotic parsing engines as the basis for the services layer between clients and server of this invention.

FIG. 5 shows fundamentally how the SPCOL client and server engines operate. A client device 501 either provides or requests a service from the server 509. This service or request is framed in the client SPCOL engine 508 and is parsed and decoded by the server SPCOL engine 516 via the SPCOL protocol 517. This protocol uses HTTP commands as its basis, and sends all data as HTTP data, not as a form request. The server SPCOL engine 516 sends its replies via the SPCOL acknowledge protocol 518. The server SPCOL engine resides as a CGI-bin program inside the standard web server. The response protocol 518 uses HTTP response commands as its basis and all responses are decoded by the client SPCOL engine 508. If a file transfer service is desired, for example, instead of calling upon the FTP network application, the client device requests to SPCOL the file transfer service 502. This service then opens a link to the client SPCOL communication layer inside the client SPCOL engine 508 via the internal API calling mechanism 505. The client SPCOL engine 508 then sends the file transfer request to the server SPCOL engine 516 via the SPCOL frame 517. The SPCOL server engine 516 then parses and decodes the file transfer service command and calls its file transfer service handler 510 via the server internal API calling mechanism 513. Similarly, if a remote monitor service 503 is desired by the client, it passes the request to the client SPCOL engine 508 via the remote monitor API 506. The SPCOL engine then passes the remote monitor service operation to the server SPCOL engine 516 via the SPCOL frame 517, where the frame is parsed. The server SPCOL engine 516 then calls the server remote monitor service 511 via the server internal API call 514. Finally, if a remote control service 504 is desired by the client, it passes the request to the client SPCOL engine 508 via the remote monitor API 507. The SPCOL engine then passes the remote control service operation to the server SPCOL engine 516 via the SPCOL frame 517, where the frame is parsed. The server SPCOL engine 516 then calls the server remote control service 512 via the server internal API call 515.

The key distinction between the use of a service layer and a new network application is how operations are handled by both the client and server. In a network application, a series of fixed functions is generally provided for, with the protocol sent directly across the transport layer (TCP for example). These fixed functions are built directly into the client and server application itself. In a service layer based protocol, the protocol engines run within the existing network application infrastructure (in this case, the HTTP application). This is the transport layer for the service. Services are created by the combination of APIs whose values are shared between the client and server. Existing network applications can be mimicked as a result (such as a file transfer) by the creation of a set of APIs to facilitate file transfer. Custom applications can also be created by creating a set of APIs as needed. Once this API foundation is created, nearly any network function can be provided for without having to create a standalone client and server network application.

Figure 6:
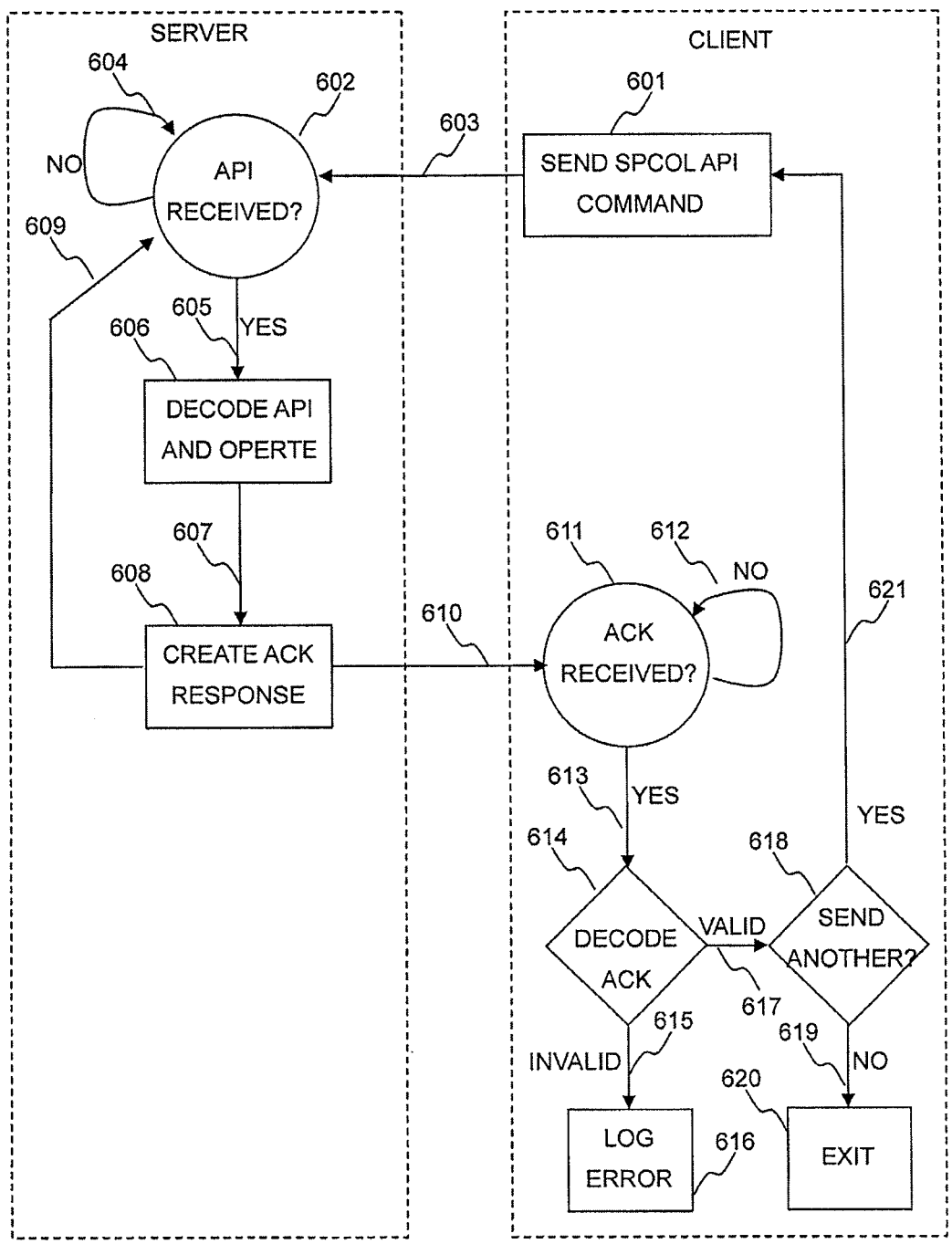
FIG. 6 illustrates the client protocol engine initiating communication between client and server of this invention.

FIG. 6 shows the fundamental algorithm for the SPCOL client and server communication protocol operation. A client initiates a request to the server via a send SPCOL API command 601. The server SPCOL CGI-bin program remains in a wait loop waiting for an API 602 to arrive via the SPCOL protocol 603. If no API is received 604, it remains in the wait loop. If an SPCOL API is received 605 it is then decoded and operated on 606. After decoding, a message is sent via 607 to create the acknowledge response 608. This response can be used to initiate additional commands via messaging 609 or sent directly to the client via the SPCOL acknowledge API 610. The client waits for the acknowledge response 611. If no response 612, it continues to wait. If a response is received 613, it is decoded 614. If the decoded response is not the proper acknowledge 615 to the API sent in 601, an error is logged 616. If it is a valid response 617, the client service determines if another message needs to be sent 618. If no message is required 619, the service exits 620. If another message is required 621, the next SPCOL API command is sent 601, repeating the process.

Due to the nature of how the HTTP application works, the server will constantly wait for requests from web clients. If the HTTP command received is a CGI-bin data packet that requests the SPCOL CGI-bin program to operate, the SPCOL engine inside the server is invoked. Other CGI-bin operations can continue, based on if existing CGI-bin requests to those applications are called by a client's web browser. SPCOL resides in an already existing web server environment and does not need a separate web server to operate. Conversely, the client side SPCOL engine can run concurrently with a web browser if desired to perform the automated tasks. By running the SPCOL service layer, it does not preclude running additional web services; it will co-exist with them.

Figure 7:
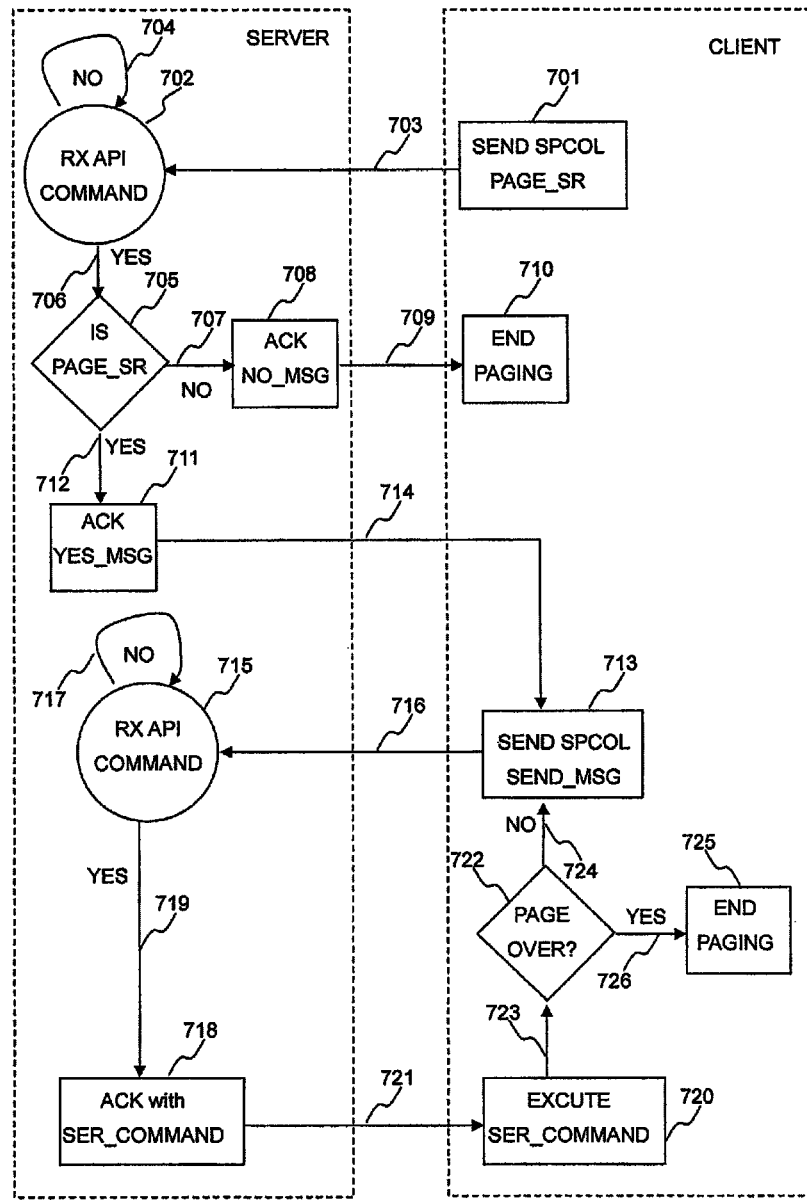
FIG. 7 illustrates the client prompting the server to see if a message exists as the means to facilitate bidirectional data exchange of this invention.

FIG. 7 shows how the prompting, or paging, of a server occurs by the client. The client sends a page server SPCOL API 701 to the server via the SPCOL protocol 703. The server waits for a SPCOL API 702. If no API is received 704, it continues to wait. If an SPCOL API is received 706, it is decoded and checked to see if it is the page server API 705. If it is not a page server API 707, the no message acknowledge is created 708 and sent to the client via the SPCOL protocol 709, where the client handles the end paging operation 710. If a message does exist 712, the yes message acknowledge is created 711 and sent to the client via the SPCOL protocol 714 where it is received by the client. The client then initiates a send message request 713 via the SPCOL protocol 716 where it is decoded by the client. The client waits for the SPCOL API command 715 and if it is not received 717, continues to wait. If a message is received 719, it generates the command desired as a server acknowledge 718. This is sent to the client via the SPCOL protocol 721 where the API is decoded and executed by the client 720. Once finished 723, the client checks to see if the API received is a page over message 722. If it is a page over API 726, the end paging function is invoked 725. If it is not an end paging API 724, another send message request is sent by the client 713, and the process repeats.

Since the HTTP application requires all clients to initiate requests, if the server is to perform any remote control type of operation, the client must initiate some kind of request and wait for a response. If the server wishes to perform a remote control operation on a specific client, each client must periodically page the server to see if a command is desired by the server. If there is no command, the client exits the page request loop until the next page interval. The length of this interval is service dependent. If a command is required, then the server will respond by sending the same SPCOL API commands as the client normally does, and the client must then in turn send the proper acknowledgements as its new requests. This allows the same APIs to be used by both the client and server to perform the same function. For example, if the server wishes to send a file to a specific client, when that client makes a page request, the server responds by acknowledging a message exists, then proceeds to respond to the client request by using the send file APIs; the exact same send file APIs are used as if the client device desired to send a file to the server. By adding this sort of handshake and protocol structure, remote control service capability is added by using the existing HTTP application infrastructure without requiring any changes to the HTTP standard. HTTP servers normally cannot make requests of clients.

Figure 8:
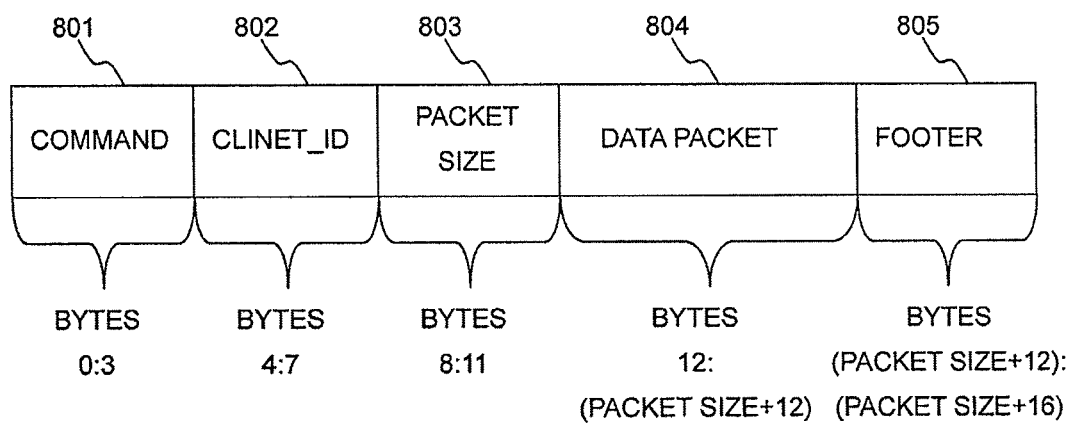
FIG. 8 illustrates the SPCOL frame structure of this invention.

FIG. 8 shows the fundamental frame structure for the SPCOL protocol. The first four bytes of the SPCOL data packet consist of the API command to be used 801. The next four bytes indicate which client is making the request 802. The next four bytes are used to indicate the amount of data to be sent in the payload 803. The following number of bytes as indicated in packet size is used for the data payload 804. Finally, a four byte footer terminates the SPCOL protocol frame.

The SPCOL frame is characterized by a fixed sized command that is coded with a value that corresponds to the API as defined in both the client and server API header files. This file must be identical for both the client and server. The client identifier field indicates which unique client is making the request. This unique identifier is key in allowing the server to understand which clients are making which API commands, and is especially important in any operation that requires multiple API operations as well as in any remote control function. The packet size is used if any payload data is associated with the command. For general communication, it is normally set to 0, but if a data operation, it is used to indicate the size of the next field, which is the data packet itself. The data packet normally has the largest number of bytes, and is limited only by the size of the data buffers used to transfer data. If the buffers are smaller than the total payload packet, the server SPCOL is able to retain temporary state as explained in FIG. 11 below. Finally, a footer is provided that allows any checksum or additional operations to occur. This normally will be used to provide for a more secure transport.

Figure 9:
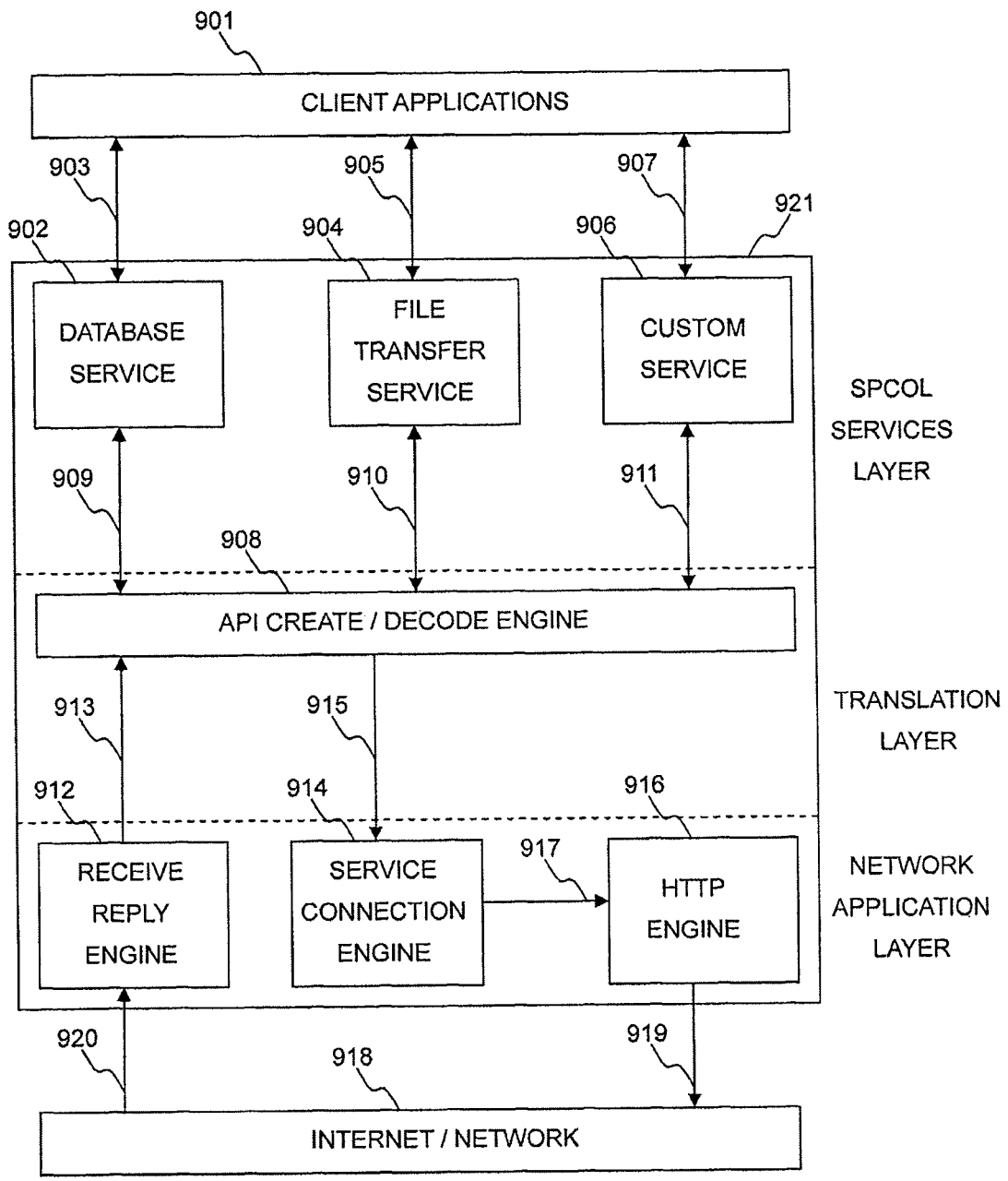
FIG. 9 illustrates the SPCOL client software architecture of this invention.

FIG. 9 shows the SPCOL client software architecture. The client software stack 921 is made up of various layers. Client applications 901 are interfaced with various SPCOL services in the SPCOL service layer. If the client application desires operation with a database, the database service 902 is interfaced with the data acquisition link 903. The database service then passes the request to the API create engine 908 through the internal SPCOL calling mechanism 909. If a file transfer operation is desired, the file transfer service 904 is interfaced with the client file system 905. The file transfer service then passes the request to the API create engine 908 through the internal SPCOL calling mechanism 910. If a custom service is desired, the custom service 906 is interfaced with the custom application via its passing mechanism 907. The custom service then passes the request to the API create engine 908 through the internal SPCOL calling mechanism 911. The API create engine 908 then takes these service requests and creates a set of SPCOL APIs that are then passed to the service connection engine 914 though the SPCOL internal calling mechanism 915. The service connection engine 914 then passes these APIs to the HTTP engine 916 via the internal SPCOL calling mechanism 917. The HTTP engine then translates the SPCOL APIs to the HTTP application data and protocol format and passes it to the network or internet 918 via the HTTP protocol 919. The server passes the response over the internet or network 918 to the client receive reply engine 912 over the HTTP application response protocol 920.

The receive response engine 912 passes the SPCOL encoded frame to the decode engine 908 via the internal SPCOL passing mechanism 913. The decode engine then routes whatever information is necessary to the service layer.

The SPCOL client architecture consists of three layers. First is the network application layer, which is the same as if SPCOL was pushed down into the application layer. There, a HTTP engine frames commands to send across the internet to a web server that is running the SPCOL server CGI-bin program. As part of the new service layer functionality, a translation layer is added that facilitates the translation of SPCOL API commands to the HTTP engine. On all server replies, the translation layer is also responsible for decoding the responses. Above the translation layer resides the SPCOL services layer. This is where all client service functionality is created, and generally consists of a combination of SPCOL APIs to generate more complex functions. Also, this is where the interface to the client software main functionality occurs. The SPCOL services interface with existing client applications that will, upon a set condition as determined by the SPCOL service, automate the communication with the server. The translation and SPCOL services layer replace the various web browser rendering engines in a standard web browser, and is the means to provide the automation desired.

Figure 10:
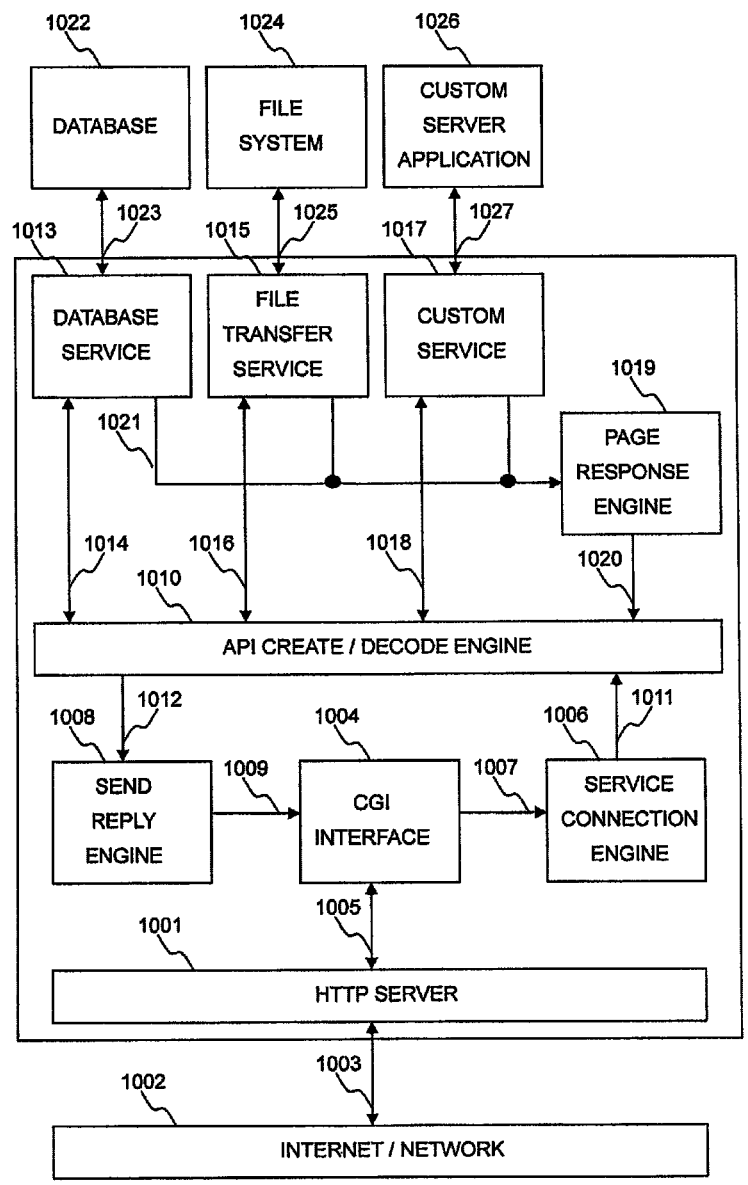
FIG. 10 illustrates the SPCOL server software architecture of this invention.

FIG. 10 shows the server SPCOL software architecture. The HTTP server 1001 connects to the internet or network 1002 via the HTTP protocol 1003. As part of the HTTP server specification, there exists a common gateway interface (CGI) 1004, which receives SPCOL requests and sends them to the service connection engine 1006. The SPCOL service connection engine then passes the SPCOL frame packets to the decode engine 1010 via the SPCOL passing mechanism 1011. The decode engine 1010 determines what type of service is being requested. If it is a database service, it passes the data to the database service 1013 via the internal passing mechanism 1014. The database service 1013 then interfaces with an external database 1022 via the database interface 1023. If the service is a file transfer, the decode engine 1010 then calls the file transfer service 1015 via the internal calling mechanism 1016. The file transfer service then stores the file to the file system 1024 via the file system interface 1025. If the service is a custom function, the decode engine 1010 passes the data to the custom service 1017 via the internal calling mechanism 1018. The custom service then interfaces to the custom server application 1026 via its interface 1027. If the request is a paging operation, once the frame has been decoded and each service has been polled to see if an operation is desired, the services will respond via the SPCOL calling mechanism 1021 to the page response engine 1019 who will determine what type of operation is to be performed for the page. Once decided, it communicates to the API create/decode engine 1010 via the internal calling mechanism 1020. Once the service has been handled, the service passes its state to the API create/decode engine 1010 to formulate the response. Once the response has been created, it passes the API request to the send reply engine 1008 through the internal calling mechanism 1012. The send reply engine 1008 creates the SPCOL frame to send back to the client. Once the frame is created, the send reply engine passes the frame to the CGI interface 1004 through the internal calling mechanism 1009. The remaining steps follow the HTTP application protocol, where the CGI response is sent to the HTTP server 1001 through the interface 1005 and finally the HTTP server 1001 sends the SPCOL frame packet to the client over the internet or network 1002 via the HTTP protocol interface 1003.

The SPCOL server architecture uses a web server as its basis. As part of the of the HTTP application spec, all web servers must support a CGI-bin interface that allows for the customization of back end processing. The CGI-bin interface is where the SPCOL server code resides. It consists of a SPCOL service connection engine and a send reply engine. Above the translation layer, just like the SPCOL client code, sits a translation layer where the actual API create and decoding occurs. Like the SPCOL client code, various SPCOL server-side services are supported, which in turn work with the server enterprise software. What differs in the server side code is the addition of a page response engine. If the enterprise software desires to control or send information to the client, it interfaces via its server-side service block to the page response engine the commands it wishes to send to a client. This paging mechanism is the root function of any remote control operation by the server.

Figure 11:
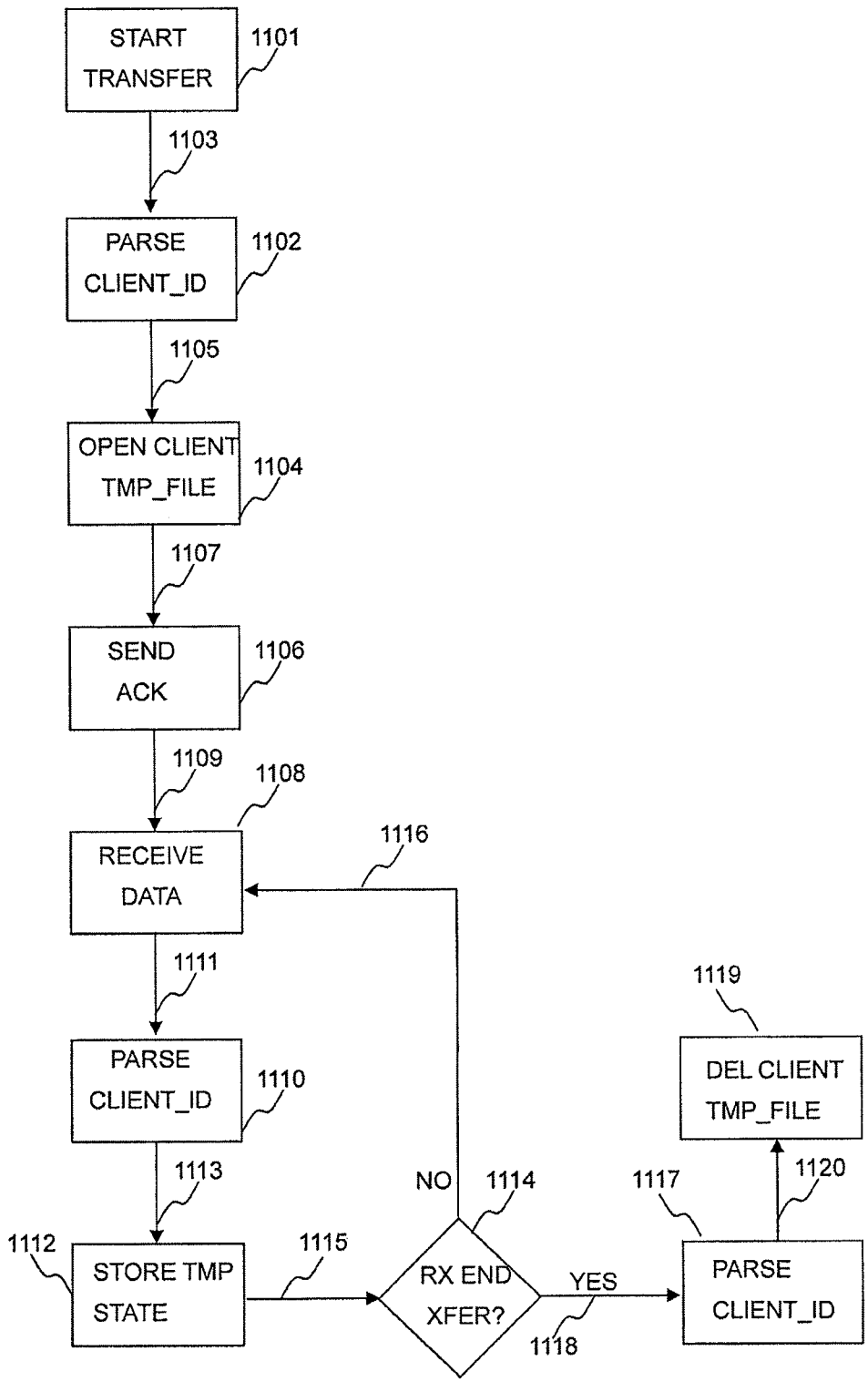
FIG. 11 illustrates the use of individual temporary files for each client transaction that is stored on the server to hold state between client transactions of this invention.

FIG. 11 shows the storing of temporary server state during multiple API transfers. When the server receives a start transfer request 1101, it then sends a request 1103 to parse the client identification 1102. It then passes the request 1105 to open the specific client temporary file 1104 based on the client identification parsed in 1102. Once the temporary file is opened, the server then passes a request 1107 to send the acknowledge 1106 that the temporary file is opened. It then passes a request 1109 to the receive data block 1108 where the server waits. Once data is received, it sends a request 1111 to parse the client identification 1110. Once parsed, it sends a request 1113 to store the temporary server state 1112. Once stored, it passes a request 1115 to see if the receive end transfer condition has occurred 1114. If no 1116, the process repeats by entering the received data block 1008 again. If yes 1118, then the server parses the client identification 1117. After the client identification has been parsed, a request is sent 1120 to delete the client temporary file 1119.

One limitation of the HTTP application layer is that it is not intended to support large transfers of data. Although the server itself, as of the HTTP specification 1.1, is able to support chunked transfer responses, there is no inherent mechanism to pass large amounts of data to the server. Any states that are used by a CGI-bin program (which the SPCOL server code is) are lost when the program terminates. If multiple SPCOL API calls are used to perform a service, the SPCOL server code will launch and terminate multiple times as the SPCOL server handles each API during each invocation. If service state information needs to be carried over from one API operation to the next, this state information needs to be stored in some manner. This is also the case if a large amount of data needs to be broken into packets for efficient or secure transfer. The storing of temporary state information in a file is the mechanism to solve this issue. However, an additional caveat is that the server code can handle multiple clients at a given time. Therefore, each client will need to have temporary state support by the server. By having the client identifier embedded into the frame packet, and then using the client ID as part of the temporary file name, unique temporary server state files can be created and managed efficiently. There is not one large temporary state file for all clients and operations but rather multiple, individual server temporary state files for each client when it is needed.

Now that the preferred embodiments of the present invention have been shown and described in detail, various modifications and improvements thereon will be clearly apparent to those skilled in the art. Accordingly, the spirit and scope of the present invention is to be construed broadly and limited only by the appended claims, and not by the foregoing specification.

What is claimed is:

1. A system for enabling non-network functionality to be networked using a symbiotic computer protocol that is embedded within an existing protocol to facilitate communication of commands and data, the symbiotic computer protocol residing on a server computer, the server computer being in communication with at least one client computer via a network, and the system being configured to:
   receive a prompt from the at least one client computer, the prompt including client identification information and a request for commands or data obtainable from applications or memory residing on the server computer;
   store the requested commands or data;
   convert the stored commands or data into a single predetermined format capable of being read by both the at least one client computer and the server computer; and
   transmit the converted commands or data to the at least one client computer via the network,
   wherein the symbiotic computer protocol that is embedded within the existing protocol is configured to enable commands or data residing on the server computer that are incapable of being natively transmitted to the at least one client computer to be converted into the single predetermined format, and to use the client identification information to determine that the at least one client computer is a correct destination to which the converted commands or data are to be transmitted.

2. The system of claim 1, wherein the single predetermined format comprises a command field, a client identification field, a packet size field, a data packet field, and a footer field.

3. The system of claim 1, wherein the symbiotic computer protocol is configured to operate within the network in a service layer that resides on top of a Hyper Text Transfer Protocol (HTTP) layer.

4. The system of claim 1, wherein the symbiotic computer protocol is configured to operate by using a network application residing in a HTTP layer to send (i) a command that is not part of an existing HTTP protocol, and (ii) a device client identifier, wherein the command is sent without requiring XML formats.

5. The system of claim 1, wherein the at least one client computer comprises a corresponding computer protocol configured to transmit the prompt to the server computer and to enable all transmitted commands and data to be received via the network and to convert each of the commands and data that are received via the network from the single predetermined format into a respective original format.

6. The system of claim 1, wherein the at least one client computer pages the server computer at known page intervals to determine whether a command is desired by the server computer.

7. The system of claim 6, wherein the at least one client computer performs either of the following: (i) exits a page request loop if there is no command, until a next page interval; or (ii) sends an acknowledgement in response to a command sent to the at least one client computer by the server computer.

8. A method for using a server computer to communicate commands and data over a network using a symbiotic protocol that is embedded within an existing protocol to enable non-network functionality to be networked, the method comprising the steps of:
   receiving a prompt from a client computer via the network, the prompt including client identification information and a request for commands or data obtainable from applications or memory residing on the server computer;
   storing the requested commands or data;
   converting the stored commands or data into a single predetermined format capable of being read by both the client computer and the server computer; and
   transmitting the converted commands or data to the client computer via the network,
   wherein the server computer is configured to enable commands or data residing on the server computer that are incapable of being natively transmitted to the client computer to be converted into the single predetermined format, and to use the client identification information to determine that the client computer is a correct destination to which the converted commands or data are to be transmitted.

9. The method of claim 8, wherein the single predetermined format comprises a command field, a client identification field, a packet size field, a data packet field, and a footer field.

10. The method of claim 8, wherein the server computer is configured to execute the method within the network in a service layer that resides on top of a Hyper Text Transfer Protocol (HTTP) layer.

11. The method of claim 8, wherein the server computer is configured to execute the method by using a network application residing in a HTTP layer to send (i) a command that is not part of an existing HTTP protocol, and (ii) a device client identifier, wherein the command is sent without requiring XML formats.

12. The method of claim 8, wherein the client computer is configured to transmit the prompt to the server computer and to enable all transmitted commands and data to be received via the network and to convert each of the commands and data that are received via the network from the single predetermined format into a respective original format.

13. The method of claim 8, further comprising the step of paging the server computer at known page intervals to determine whether a command is desired by the server computer, wherein the client computer performs either of the following: (i) exits a page request loop if there is no command, until a next page interval; or (ii) sends an acknowledgement in response to a command sent to the client computer by the server computer.

14. A system for communicating commands and data over a network using a symbiotic protocol that is embedded within an existing protocol to enable non-network functionality to be networked, the system comprising a server computer, the server computer being in communication with at least one client computer via the network, and the server computer being configured to:
   receive a prompt from the at least one client computer via the network, the prompt including client identification information and a request for commands or data obtainable from applications or memory residing on the server computer;
   store the requested commands or data;
   convert the stored commands or data into a single predetermined format capable of being read by both the at least one client computer and the server computer; and
   transmit the converted commands or data to the at least one client computer via the network,
   wherein the server computer is further configured to enable commands or data residing on the server computer that are incapable of being natively transmitted to the at least one client computer to be converted into the single predetermined format, and to use the client identification information to determine that the at least one client computer is a correct destination to which the converted commands or data are to be transmitted.

15. The system of claim 14, wherein the single predetermined format comprises a command field, a client identification field, a packet size field, a data packet field, and a footer field.

16. The system of claim 14, wherein the server computer is configured to receive the prompt, store the requested commands or data, convert the stored commands or data, and transmit the converted commands or data within the network in a service layer that resides on top of a Hyper Text Transfer Protocol (HTTP) layer.

17. The system of claim 14, wherein the server computer is configured to receive the prompt, store the requested commands or data, convert the stored commands or data, and transmit the converted commands or data within the network by using a network application residing in a HTTP layer to send (i) a command that is not part of an existing HTTP protocol, and (ii) a device client identifier, wherein the command is sent without requiring XML formats.

18. The system of claim 14, wherein the at least one client computer is configured to transmit the prompt to the server computer and to enable all transmitted commands and data to be received via the network and to convert each of the commands and data that are received via the network from the single predetermined format into a respective original format.

19. The system of claim 14, wherein the at least one client computer is further configured to page the server computer at known page intervals to determine whether a command is desired by the server computer.

20. The system of claim 19, wherein the at least one client computer performs either of the following: (i) exits a page request loop if there is no command, until a next page interval; or (ii) sends an acknowledgement in response to a command sent to the at least one client computer by the server computer.

* * * * *